US012503712B2

(12) United States Patent
Jang et al.

(10) Patent No.: US 12,503,712 B2
(45) Date of Patent: Dec. 23, 2025

(54) MICROORGANISM COMPRISING VARIANT LYSE AND METHOD OF L-AMINO ACID PRODUCTION USING SAME

(71) Applicant: CJ CheilJedang Corporation, Seoul (KR)

(72) Inventors: Jaewon Jang, Seoul (KR); Jihyun Shim, Seoul (KR); Sang Min Park, Seoul (KR); Hyun Won Bae, Seoul (KR); Hyo Jeong Byun, Seoul (KR); Yong Uk Shin, Seoul (KR); Han Hyoung Lee, Seoul (KR); Boram Lim, Seoul (KR); Moo Young Jung, Seoul (KR); Yunjung Choi, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 450 days.

(21) Appl. No.: 17/784,775

(22) PCT Filed: Feb. 10, 2021

(86) PCT No.: PCT/KR2021/001793
§ 371 (c)(1),
(2) Date: Jun. 13, 2022

(87) PCT Pub. No.: WO2021/162459
PCT Pub. Date: Aug. 19, 2021

(65) Prior Publication Data
US 2023/0072150 A1 Mar. 9, 2023

(30) Foreign Application Priority Data
Feb. 13, 2020 (KR) ........................ 10-2020-0017559

(51) Int. Cl.
| | | |
|---|---|---|
| *C12P 13/08* | (2006.01) | |
| *C07K 14/34* | (2006.01) | |
| *C12N 15/70* | (2006.01) | |
| *C12N 15/77* | (2006.01) | |
| *C12P 13/10* | (2006.01) | |

(52) U.S. Cl.
CPC .............. *C12P 13/08* (2013.01); *C07K 14/34* (2013.01); *C12N 15/70* (2013.01); *C12N 15/77* (2013.01); *C12P 13/10* (2013.01)

(58) Field of Classification Search
CPC .................................. C12P 13/08; C12N 15/70
See application file for complete search history.

(56) References Cited

U.S. PATENT DOCUMENTS

| | | | |
|---|---|---|---|
| 6,858,406 B1 * | 2/2005 | Vrlijc | C07K 14/34 435/252.32 |
| 7,901,913 B2 | 3/2011 | Dunican et al. | |
| 8,445,241 B2 | 5/2013 | Dunican et al. | |
| 9,109,242 B2 | 8/2015 | Park et al. | |
| 2004/0146974 A1 | 7/2004 | Gunji et al. | |

FOREIGN PATENT DOCUMENTS

| | | |
|---|---|---|
| BR | 112012 024799 | 10/2011 |
| CN | 1398964 | 2/2003 |
| CN | 1618970 | 5/2005 |
| CN | 1737121 | 2/2006 |
| CN | 102747025 | 10/2012 |
| CN | 106635944 | 5/2017 |
| JP | 2003-061687 | 3/2003 |
| JP | 2004-248669 | 9/2004 |
| JP | 2008-043201 | 2/2008 |
| KR | 10-1992-0007401 | 8/1992 |
| KR | 10-0159812 | 11/1998 |
| KR | 10-1999-0076708 | 10/1999 |
| KR | 10-2001-0112494 | 12/2001 |
| KR | 10-0924065 | 10/2009 |
| KR | 10-2139806 | 7/2020 |
| WO | 1997-23597 | 7/1997 |
| WO | 2011-124477 | 10/2011 |
| WO | 2019-228937 | 12/2019 |

OTHER PUBLICATIONS

A0A160PQ22_CORGT. UniProtKB/TrEMBL Database. Dec. 20, 2017.*
Fransceus. J Ind Microbiol Biotechnol. May 2017;44(4-5):687-695.*
Sanavia. Computational and Structural Biotechnology Journal, vol. 18, 2020, pp. 1968-1979.*
Studer. Residue mutations and their impact on protein structure and function: detecting beneficial and pathogenic changes. Biochem. J. (2013) 449, 581-594.*
A0A160PQ22. UniProtKB/TrEMBL Database. Dec. 20, 2017.*
Kipo, PCT Search Report & Written Opinion of Application No. PCT/KR2021/001793, dated May 27, 2021.
Yoshiya Gunji et al., "Characterization of a Unique Mutant lysE Gene, Originating from Corynebacterium glutamicum, Encoding a Product That Induces L-Lysine Production in Methylophilus methylotrophus", Biosci. Biotechnol. Biochem., 70 (12), 2927-2934, 2006, Dec. 7, 2006.
Peter Rice et al., "EMBOSS: The European Molecular Biology Open Software Suite" 2000, Trends Genet. 16: 276-277, Jun. 2000.
Temple F. Smith et al., "Comparison of Biosequences", Advances in Applied Mathematics 2,482-489 (1981), Dec. 1981.
Saul B. Needleman et al., "A General Method Applicable to the Search for Similarities in the Amino Acid Sequence of Two Proteins", J. Mol. Biol. (1970) 48, 443-453, Mar. 1970.
Michael Gribskov et al., "Sigma factors from *E. coli*, B. subtils, phage SP01, and phage T4 are homologous proteins", Nucleic Acids Research vol. 14 No. 16 1986, Aug. 1986.

(Continued)

*Primary Examiner* — Yong D Pak
(74) *Attorney, Agent, or Firm* — LEX IP MEISTER, PLLC

(57) ABSTRACT

Provided are a microorganism comprising variant LysE, and an L-amino acid producing method using same. The variant LysE may improve L-amino acid excretion and/or production capacity compared to a wild type.

15 Claims, No Drawings
Specification includes a Sequence Listing.

(56) References Cited

OTHER PUBLICATIONS

Sambrook J. et al., Molecular Cloning, A Laboratory Manual, 2nd Edition, Cold Spring Harbor Laboratory press, Cold Spring Harbor, New York, 1989.
F.M. Ausubel et al., Current Protocols in Molecular Biology, John Wiley & Sons, Inc., New York, 1989.
M E van der Rest et al., "A heat shock following electroporation induces highly efficient transformation of Corynebacterium glutamicum with xenogeneic plasmid DNA", Appl. Microbiol. Biotecnol. 52:541-545, Oct. 1999.
Samuel Karlin et al., "Applications and statistics for multiple high-scoring segments in molecular sequences", Pro. Natl. Acad. Sci. USA, 90, 5873, Jun. 1993.
William R. Pearson, "Rapid and Sensitive Sequence Comparison with FASTP and FASTA", Methods Enzymol., 183, 63, 1990.
Sambrook et al., Molecular Cloning: A Laboratory Manual, 3rd ed., vol. 2, supra,9.50-9.51, 11.7-11.8, 2001.
GenBank accession BAU95646, "lysine exporter protein [*Corynebacterium suranareeae*]" May 3, 2016.
Vrljic, M., et al. "The LysE superfamily: topology of the lysine exporter LysE of Corynebacterium glutamicum, a paradyme for a novel superfamily of transmembrane solute translocators", Journal of molecular microbiology and biotechnology 1.2 (Nov. 1999): 327-336.
Zhang Xing-yuan, et al. "The Occurrence and Functions of Amino Acid Transport Proteins in Corynebacterium glut amicum" Journal of Wuxi University of Light Industry vol. 23. No. 3 (May 2004), pp. 105-110.
GenBank: ALP49960.1,"lysine transporter LysE [*Corynebacterium glutamicum*]" Dec. 22, 2015.
Kolman Ya, et al. "Naglyadnaya Biokhimiya [Visual Biochemistry]." Moscow, Mir (2000), pp. 186-187.
IP Australia, Office Action of the corresponding AU Patent Application No. 2021221374 dated Feb. 20, 2023.
Rospatent, Office Action of the corresponding RU Patent Application No. 2022120041, dated Apr. 4, 2023.
Rospatent, search report of RU Patent Application No. 2022120041, dated Apr. 4, 2023.
Brazil National Institute of Industrial Property, Office Action of the corresponding BR Patent Application No. BR1120220159456, dated Apr. 7, 2025, total 18 pages.
EPO, Extended European Search Report of the corresponding European Patent Application No. 21753577.2., dated Jun. 17, 2025, total 8 pages.

\* cited by examiner

MICROORGANISM COMPRISING VARIANT LYSE AND METHOD OF L-AMINO ACID PRODUCTION USING SAME

TECHNICAL FIELD

Cross-Reference to Related Applications

This application claims the benefit of KR 10-2020-0017559 filed on Feb. 13, 2020 with the Korean Intellectual Property Office, the entire disclosure of which is herein incorporated by reference.

Provided are a microorganism comprising a mutated LysE, and a method of producing an L-amino acid using same. The mutated LysE may enhance the ability of exporting and/or producing an L-amino acid compared with wild-type LysE.

BACKGROUND ART

Microorganisms belonging to the genus of *Corynebacterium* are Gram-positive and have been widely used in the production of L-amino acids. L-amino acids, especially L-lysine, find applications in the animal feed industry and the human medical and cosmetic industries. For industrial applications, L-amino acids are, for the most part, produced by fermentation using *Corynebacterium* strains.

Many attempts have been made to improve L-amino acid producing methods using *Corynebacterium* spp. strains. Among them are studies on recombinant DNA technology by which specific genes are manipulated to knockdown or attenuated expression to produce L-amino acids. In addition, there have been studies in which each of genes involved in L-amino acid biosynthesis is amplified and analyzed for effect on L-amino acid production, thereby modifying L-amino acid producing *Corynebacterium* strains. In addition, there have been attempts to introduce foreign genes derived from other bacteria.

Nevertheless, there is still a need for development of techniques to improve the production potential of useful substances, such as L-amino acids.

DISCLOSURE

Technical Problem

An embodiment provides a mutated lysine exporter. For example, the mutated lysine exporter may be a polypeptide wherein asparagine (Asn, N), which is the 65$^{th}$ amino acid from the N-terminus of the amino acid sequence of SEQ ID NO: 1, is substitute with other amino acid. The polypeptide may have activity of an exporter of an L-amino acid (e.g., L-lysine, L-arginine, a combination thereof, etc.).

Another embodiment provides a polynucleotide encoding the polypeptide (mutated lysine exporter).

Another embodiment provides a recombinant vector comprising the polynucleotide.

Another embodiment provides a recombinant microorganism comprising the polypeptide, a polynucleotide encoding the polypeptide, or a recombinant vector comprising the polynucleotide. The recombinant microorganism may have an ability of exporting and/or producing an L-amino acid, or increased ability of exporting and/or producing an L-amino acid compared with that of non-mutated microorganism.

Another embodiment provides a method of producing an L-amino acid, comprising culturing the recombinant microorganism or L-amino acid producing microorganism.

Technical Solution

Suggested according to an embodiment provided herein is a strain modification technology for amino acid production on the basis of investigating how the amplification of a gene involved in lysine production of *Corynebacterium* spp. microorganisms affects a lysine production potential thereof. Generally, strategies for increasing production potentials of lysine include improving production yields of lysine, or increasing outputs (productivity) of lysine per unit time. As part of this, it is suggested herein that the yield and/or productivity of lysine can be increased by improving an L-lysine exporter protein, which is a membrane protein having a function of releasing lysine produced through biosynthesis. An embodiment of the present application provides a technology related to developing a strain having an enhanced ability of exporting an L-amino acid (e.g., L-lysine, L-arginine, a combination thereof, etc.) by improving an L-lysine exporter protein and/or a lysE gene encoding the same.

An embodiment provides a mutated lysine exporter. For example, the mutated lysine exporter may be a polypeptide wherein asparagine (Asn, N), which is the 65$^{th}$ amino acid from the N-terminus of the amino acid sequence of SEQ ID NO: 1, is substitute with other amino acid. The polypeptide may have an activity of an exporter of L-amino acid (e.g., L-lysine, L-arginine, a combination thereof, etc.).

Another embodiment provides a polynucleotide encoding the polypeptide (mutated lysine exporter).

Another embodiment provides a recombinant vector comprising the polynucleotide. The recombinant vector may be used as an expression vector.

Another embodiment provides a recombinant microorganism comprising the polypeptide, a polynucleotide encoding the polypeptide, or a recombinant vector comprising the polynucleotide. The recombinant microorganism may have an ability of exporting and/or producing an L-amino acid, or increased ability of exporting and/or producing an L-amino acid compared with that of non-mutated microorganism.

Another embodiment provides a method of producing an L-amino acid, comprising culturing the recombinant microorganism or an L-amino acid producing microorganism.

The L-amino acid may be L-lysine, L-arginine, or a combination thereof.

The microorganism may be a microorganism of genus *Corynebacterium* or *Escherichia*.

A detailed description will be given of the present disclosure.

As used herein, the term "lysine exporter protein or lysine exporter (LysE)" may refer to one of transmembrane proteins, which is capable of releasing an intracellular biosynthetic product, for example, an L-amino acid such as L-lysine, out of cells. In an embodiment, the lysine exporter protein may be derived from a strain belonging to genus *Corynebacterium*, for example, *Corynebacterium glutamicum*. For example, the lysine exporter may be represented by the amino acid sequence of SEQ ID NO: 1.

The mutated lysine exporter may be a polypeptide wherein a mutation of amino acid substitution is introduced into a lysine exporter. In an embodiment, the mutated lysine exporter may be a polypeptide wherein, in the amino acid sequence of SEQ ID NO: 1, the 65$^{th}$ amino acid from the N-terminus, asparagine (N), is substitute with other amino acid (e.g., a polypeptide represented by an amino acid sequence wherein, in the amino acid sequence of SEQ ID NO: 1, the 65$^{th}$ amino acid from the N-terminus, asparagine (N), is substitute with other amino acid). More specifically, the mutated lysine exporter may be a polypeptide wherein, in the amino acid sequence of SEQ ID NO: 1, the $65^{th}$ amino acid from the N-terminus, asparagine (N), is substitute with one selected from the group consisting of glutamic acid (E), glycine (G), alanine (A), serine (S), threonine (T), cysteine (C), valine (V), leucine (L), isoleucine (I), methionine (M), proline (P), phenylalanine (F), tyrosine (Y), tryptophan (W), aspartic acid (D), glutamine (Q), histidine (H), lysine(K), and arginine(R). In a specific embodiment, the mutated lysine exporter may be a polypeptide represented by SEQ ID NO: 3 (wherein the $65^{th}$ amino acid of SEQ ID NO 1, asparagine(N), is substituted with glutamic acid (E)), but is not limited thereto. Such mutation introduced polypeptide may have a function as an exporter of L-amino acid (e.g., L-lysine, L-arginine, a combination thereof, etc.).

As used herein, the term "L-amino acid producing microorganism" may refer to a microorganism that has an increased potential of exporting and/or producing an L-amino acid by introducing a lysine exporter mutation as described above into a microorganism with an ability of exporting and/or producing an L-amino acid, and/or a microorganism that has a potential of exporting and/or producing an L-amino acid by introducing a lysine exporter mutation as described above into a microorganism without (deficient in) an ability of exporting and/or producing an L-amino acid. The term "microorganism", as used herein, may be intended to encompass unicellular bacteria and can be used interchangeably with "cell".

The L-amino acid may be L-lysine, L-arginine, or a combination thereof.

In an embodiment, the microorganism may be selected from all microorganisms having an ability of exporting and/or producing an L-amino acid (for example, L-lysine, L-arginine, or a combination thereof). In an embodiment, the microorganism may be a microorganism naturally having an ability of exporting and/or producing an L-amino acid, or a microorganism acquiring an ability of exporting and/or producing an L-amino acid by introducing an mutation into a parental strain without or with very little ability of exporting and/or producing an L-amino acid.

For example, the microorganism may be at least one selected from the group consisting of microorganisms belonging to genus *Corynebacterium* and genus *Escherichia*, which naturally have an ability of exporting and/or producing an L-amino acid, or acquire an ability of exporting and/or producing an L-amino acid by introducing an mutation into a parental strain without or with very little ability of exporting and/or producing an L-amino acid. The microorganism belonging to genus *Corynebacterium* may include *Corynebacterium glutamicum, Corynebacterium ammoniagenes, Brevibacterium lactofermentum, Brevibacterium flavum, Corynebacterium thermoaminogenes, Corynebacterium efficiens*, and the like, but not be limited thereto. More specifically, the microorganism belonging to genus *Corynebacterium* may be *Corynebacterium glutamicum*. The microorganism belonging to genus *Escherichia* may be *Escherichia coli*.

In an embodiment, the L-amino acid producing microorganism, into which the mutation of lysine exporter is introduced, may have increased ability of exporting and/or producing an L-amino acid, compared to an unmodified microorganism belonging to the same species (homogeneous). The unmodified microorganism may refer to a microorganism without or prior to introduction of the mutation of lysine exporter.

As used herein, the microorganism prior to introduction of the mutation of lysine exporter may be expressed as a host microorganism or a parent strain, in order to discriminate from the "L-amino acid producing microorganism" in which the mutation of lysine exporter is introduced thereby having increased ability of exporting and/or producing an L-amino acid or acquiring ability of exporting and/or producing an L-amino acid.

As used herein, the term "introduction of mutation of lysine exporter" may refer to any manipulation for introducing the mutated lysine exporter as described above into a host microorganism.

The "L-amino acid producing microorganism into which the mutation of lysine exporter is introduced" may refer to a microorganism comprising:

(1) a mutated lysine exporter as described above, for example, a polypeptide wherein the $65^{th}$ amino acid from the N-terminus of the amino acid sequence of SEQ ID NO: 1, asparagine (N), is substituted with other amino acid, (2) a polynucleotide encoding the polypeptide (mutated lysine exporter), or (3) a recombinant vector comprising the polynucleotide, thereby having increased ability of exporting and/or producing an L-amino acid or acquiring ability of exporting and/or producing an L-amino acid.

The microorganism comprising a polynucleotide encoding the mutated lysine exporter, for example, a polypeptide wherein the $65^{th}$ amino acid from the N-terminus of the amino acid sequence of SEQ ID NO: 1, asparagine (N), is substituted with other amino acid, or a recombinant vector comprising the polynucleotide, may refer to:

(i) a microorganism further comprising the polynucleotide or the recombinant vector in addition to its genome own; and/or (ii) a microorganism comprising the polynucleotide as an endogenous lysine exporter coding gene (e.g., LysE gene).

The expression (ii) "a microorganism comprising the polynucleotide as an endogenous lysine exporter coding gene (e.g., LysE gene)" may refer to (a) a microorganism in which the polynucleotide is comprised (inserted) by replacing an endogenous lysine exporter coding gene (e.g., LysE gene), and/or (b) a microorganism in which an endogenous lysine exporter coding gene (e.g., LysE gene) is mutated (modified) so as to have an nucleic acid sequence of the polynucleotide (i.e., a nucleic acid sequence encoding the mutated lysine exporter) by a gene editing technology.

In an embodiment, the lysine exporter or its coding gene may be derived from a host microorganism (endogenous) or derived from other microorganism (exogenous).

In an embodiment, the L-amino acid producing microorganism may comprise a polynucleotide encoding an amino acid sequence wherein in the amino acid sequence of SEQ ID NO: 1, the $65^{th}$ amino acid from the N-terminus, asparagine (N), is substitute with one selected from the group consisting of glutamic acid (E), glycine (G), alanine (A), serine (S), threonine (T), cysteine (C), valine (V), leucine (L), isoleucine (I), methionine (M), proline (P), phenylalanine (F), tyrosine (Y), tryptophan (W), aspartic acid (D), glutamine (Q), histidine (H), lysine(K), and arginine(R), and/or a recombinant vector comprising the polynucleotide. Specifically, the L-amino acid producing microorganism may comprise a polynucleotide encoding an amino acid sequence wherein in the amino acid sequence of SEQ ID NO: 1, the $65^{th}$ amino acid from the N-terminus, asparagine (N), is substitute with glutamic acid (E), and/or a recombinant vector comprising the polynucleotide. More specifically, the L-amino acid producing microorganism may be a genus *Corynebacterium*, for example, *Corynebacterium glutamicum*, comprising a polynucleotide encoding the amino acid sequence of SEQ ID NO: 3, and/or a recombinant vector comprising the polynucleotide. For example, the L-amino acid producing microorganism may be the microorganism deposited under accession number KCCM12641P.

With respect to a polynucleotide (used interchangeably with "gene") or a polypeptide (used interchangeably with "protein"), as used herein, the wordings "comprising a specific nucleic acid or amino acid sequence", "consisting of a specific nucleic acid or amino acid sequence", and "being expressed as a specific nucleic acid or amino acid sequence" are interchangeable expressions with the equivalent meanings that the polynucleotide or polypeptide essentially comprises the specific nucleic acid or amino acid sequence. Further, these wordings may be construed as "comprising a substantially equivalent sequence" (or as "not excluding introduction of the following mutation"), which results from a mutation (deletion, substitution, modification, and/or addition) to the specific nucleic acid or amino acid sequence insofar as the polynucleotide or polypeptide retains its original function and/or desired function.

In an embodiment, the nucleic acid sequence or amino acid sequence provided herein may comprise mutants thereof obtained by conventional mutation methods, for example, direct evolution and/or site-directed mutagenesis insofar as the mutants retain the original function or desired function of the sequence. In an embodiment, the expression that a polynucleotide or polypeptide "comprises or consists of or expressed by a specific nucleic acid or amino acid sequence" may mean that a polynucleotide or polypeptide essentially comprises or consists essentially of (i) the specific nucleic acid or amino acid sequence, or (ii) a nucleic acid or amino acid sequence having a sequence identity of 60% or greater, 70% or greater, 80% or greater, 85% or greater, 90% or greater, 91% or greater, 92% or greater, 93% or greater, 94% or greater, 95% or greater, 96% or greater, 97% or greater, 98% or greater, 99% or greater, 99.5% or greater, or 99.9% or greater, wherein the polynucleotide or polypeptide retains its original function and/or desired function. As used herein, the term "original function" means the lysine exporter function per se (for amino acid sequence), or a function to coding for a protein having the lysine exporter function (for a nucleic acid sequence) and the term "desired function" means a function to increase ability of production and/or exporting an L-amino acid (e.g., L-lysine, L-arginine, or a combination thereof) in a microorganism or to confer ability of production and/or exporting an L-amino acid (e.g., L-lysine, L-arginine, or a combination thereof) to a microorganism.

For the nucleotide sequences described herein, various modifications can be made in the coding regions insofar as they do not change amino acid sequences and/or functions of the protein (lysine exporter) expressed from the coding regions, due to codon degeneracy or in consideration of the codons preferred by the microorganisms in which the protein are to be expressed.

In this disclosure, the terms "homology" or "identity" may refer to the degree of relation between two given amino acid sequences or base sequences and may be expressed as a percentage. The terms homology and identity can often be used interchangeably.

The sequence homology or identity of a conserved polynucleotide or polypeptide may be determined by standard alignment algorithms, and the default gap penalty established by the program used can be used together. Substantially, homologous or identical sequences can be hybridized to each other under moderate or high stringent conditions generally along at least about 50%, 60%, 70%, 80% or 90% of a whole sequence or full-length. It is clear that for hybridization, the polynucleotide may include not only one comprising general codon but also one comprising a codon in consideration of codon degeneracy.

Whether any two polynucleotide or polypeptide sequences have homology, similarity or identity can be determined by a known computer algorithm such as "FASTA" program using default parameters, for example, presented in Pearson et al (1988) [Proc. Natl. Acad. Sci. USA 85]: 2444. Alternatively, it can be determined using a Needleman-Wunsch algorithm (Needleman and Wunsch, 1970, J. Mol. Biol. 48: 443-453) as performed in the Needlema program (EMBOSS: The European Molecular Biology Open Software Suite, Rice et al., 2000, Trends Genet. 16: 276-277)(version 5.0.0 or later version) of the EMBOSS package (such as, GCG program package (Devereux, J., et al, Nucleic Acids Research 12: 387 (1984)), BLASTP, BLASTN, FASTA (Atschul, [S.] [F.,] [ET AL, J MOLEC BIOL 215]: 403 (1990); Guide to Huge Computers, Martin J. Bishop, [ED.,] Academic Press, San Diego, 1994, [CARILLO ETA/.]1(1988) SIAM J Applied Math 48: 1073, and the like). For example, the homology, similarity, or identity can be determined using BLAST, or ClustalW of the National Center for Biotechnology Information.

The homology, similarity or identity of a polynucleotide or polypeptide, may be determined by comparing the sequence information, using a GAP computer program such as "Needleman et al. (1970), J. Mol Biol. 48:443", for example as described in Smith and Waterman, Adv. Appl. Math (1981) 2:482. In summary, the GAP program may define a value by dividing the number of similarly aligned symbols (i.e., nucleotides or amino acids) by the total number of symbols in the shorter of the two sequences. The default parameters for the GAP program may comprise (1) a binary comparison matrix (containing values of 1 for identity and 0 for non-identity) and a weighted comparison matrix (or EDNAFULL (EMBOSS version of NCBI NUC4.4) substitution matrix) of "Gribskov et al(1986) Nucl. Acids Res. 14: 6745" as described in "Schwartz and Dayhoff, eds., Atlas Of Protein Sequence And Structure, National Biomedical Research Foundation, pp. 353-358 (1979)"; (2) a penalty of 3.0 for each gap and an additional 0.10 penalty for each symbol in each gap (or a gap opening penalty of 10, a gap extension penalty of 0.5); and (3) no penalty for end gap.

In addition, whether any two polynucleotide or polypeptide sequences have homology, similarity or identity can be confirmed by comparing the sequences by Southern hybridization under defined stringent conditions, and the appropriate hybridization conditions may be determined by a method within the scope of relevant technology and well known to a person skilled in the art (for example, J. Sambrook et al., Molecular Cloning, A Laboratory Manual, 2nd Edition, Cold Spring Harbor Laboratory press, Cold Spring Harbor, New York, 1989; F. M. Ausubel et al., Current Protocols in Molecular Biology, John Wiley & Sons, Inc., N.Y.).

For the introduction of the polynucleotide or vector, a person skilled in the art can appropriately adopt a transformation method known in the art. As used herein, the term "transformation" may refer to an action by which a vector carrying a polynucleotide coding for a target protein (lysine exporter) is introduced into a host microorganism to express the protein encoded by the polynucleotide in the host cell. The introduced polynucleotide may be located inside or outside the chromosome of the host microorganism as long as it is expressed in the host microorganism. In addition, the polynucleotide may comprise a DNA and/or RNA for encoding a target protein. So long as it enables the introduction and expression of the polynucleotide in a host microorganism, any delivery means may be employed. For example, a polynucleotide may take a form of an expression cassette that comprises all the elements necessary for autonomous expression in order that the polynucleotide is introduced into a host microorganism. The expression cassette may comprise conventional expression regulatory elements operably linked to the polynucleotide, such as a promoter, a transcription stop signal, a ribosome binding site, and/or a translation stop signal. The expression cassette may be an expression vector that can replicate by itself. In addition, the polynucleotide per se may be introduced into a host cell and may be operably linked to a sequence necessary for expression in the host cell. As used herein, the term "operably linked" may mean a functional connection between an expression regulatory element (e.g., promoter) and the polynucleotide so that the expression regulatory element can control (e.g., initiate) the transcription of the polynucleotide encoding a target protein (lysine exporter). An operable linkage can be accomplished using a genetic recombination technology known in the art, for example, typical site-specific DNA cleavage and ligation, but without limitations thereto.

Any introduction method may be employed as long as it allows the transformation of the polynucleotide into a host microorganism. Transformation techniques known in the art could be properly selected according to host microorganisms. Examples of the transformation techniques known in the art may include electroporation, calcium phosphate (CaPO$_4$) precipitation, calcium chloride (CaCl$_2$) precipitation, microinjection, polyethylene glycol mediated uptake, DEAE-dextran-mediated delivery, cationic liposome method, (PEG)-lipofection, and lithium acetate-DMSO method, but not be limited thereto.

A person skilled in the art can select a suitable method for introduction of the mutation, such as incorporating the polynucleotide into a genome (chromosome) in a host cell or introducing a mutation that makes an endogenous gene (e.g., LysE gene) encode a mutated lysine exporter. For example, the introduction of the mutation may be performed using an RNA-guided endonuclease system (for example, at least one selected from the group consisting of a mixture of (a) RNA-guided endonuclease (e.g., Cas9 protein, etc.), a gene coding therefor, or a vector carrying the gene; and (b) guide RNA (i.e., single guide RNA (sgRNA), etc.), DNA coding therefor, or a vector carrying the DNA (e.g., a mixture of RNA-guided endonuclease protein and guide RNA), a complex (e.g., ribonucleoprotein (RNP)), and a vector (e.g., a recombinant vector carrying RNA-guided endonuclease encoding gene and a DNA coding for guide RNA, etc.)), but without limitations thereto.

Another embodiment provides a method of increasing ability of exporting and/or producing an L-amino acid of a microorganism or conferring ability of exporting and/or producing an L-amino acid to a microorganism, comprising introducing (transforming) a mutated lysine exporter, for example, a polypeptide wherein in the amino acid sequence of SEQ ID NO: 1, the 65$^{th}$ amino acid from the N-terminus, asparagine (Asn, N), is substitute with other amino acid, a polynucleotide coding therefor, or a recombinant vector comprising the polynucleotide.

The mutated lysine exporter, polynucleotide, and microorganism are as described above.

As used herein, the term "vector" may refer to a DNA construct containing a target protein-encoding nucleotide sequence which is operably linked to a suitable regulating sequence capable of effecting the expression of the target protein in a suitable host. Such regulating sequences may comprise a promoter capable of initiating transcription, an optional operator sequence to control such transcription, a sequence encoding suitable mRNA ribosome binding sites, and/or sequences which control termination of transcription and/or translation. Once transformed into a suitable host microorganism, the vector may replicate and function to express the target protein independently of the host genome or may integrate into the genome of a host microorganism.

So long as it replicates in a host cell, any vector can be employed herein with no particular limitations imparted thereto. It may be selected from among commonly used vectors. Examples of such commonly used vectors may include plasmids, cosmids, viruses, bacteriophages, and the like, which may be in a natural or recombinant form. For instance, the phage vector or cosmid vector is exemplified by pWE15, M13, MBL3, MBL4, IXII, ASHII, APII, t10, t11, Charon4A, and Charon21A. The plasmid vectors may be derived from pBR-, pUC-, pBluescriptII-, pGEM-, pTZ-, pCL- and pET lineages. Examples of the vector may include, but are not limited to, pDZ, pACYC177, pACYC184, pCL, pECCG117, pUC19, pBR322, pMW118, pCC1BAC, and the like.

A vector available herein may be a known expression vector and/or a vector for incorporating a polynucleotide into a chromosome of a host cell. The incorporation of a polynucleotide into a chromosome of a host cell may be achieved using any method known in the art, for example, homologous recombination, but with no limitations thereto. The vector may further carry a selection marker for determining whether a gene of interest is incorporated into a chromosome. The selection marker is to select a cell transformed with the vector, that is, to determine the incorporation of the polypeptide and may be selected from among genes that confer selectable phenotypes, such as drug resistance, auxotrophy, cytotoxic drug resistance, and expression surface proteins. Under the circumstance where a selective agent is applied to cells, only the cells capable of expressing a selection marker can survive or express a distinctive phenotype so that the transformed cells can be selected.

Another embodiment provides a method for producing an L-amino acid, the method comprising a step of culturing the L-amino acid producing microorganism in a medium. The method may further comprise a step of recovering the L-amino acid from the cultured microorganism, the medium or both thereof, subsequent to the culturing step.

In the method, the step of culturing the microorganism may be performed by known batch culturing methods, continuous culturing methods, fed-batch culturing methods, etc., but with no particular limitation thereto. Here, culture conditions may be maintained at an optimal pH (e.g., a pH of 5 to 9, specifically a pH of 6 to 8, and most specifically a pH of 6.8) using basic compounds (e.g., sodium hydroxide, potassium hydroxide, or ammonia) or acidic compounds (e.g., phosphoric acid or sulfuric acid) or at an aerobic condition by supplying oxygen or oxygen-containing gas mixture to a cell culture, but with no particular limitations thereto. The culture temperature may be maintained at 20 to 45° C. and specifically at 25 to 40° C. and the cells may be cultured for about 10 to 160 hours, but with no limitations thereto. The L-amino acid (e.g., L-lysine, L-arginine, or a combination thereof) produced by the culturing may be exported to the culture medium or remain within the cells.

A medium available for the cultivation may comprise at least one selected from sugar and carbohydrate (e.g., glucose, sucrose, lactose, fructose, maltose, molasses, starch, and cellulose), oil and fat (e.g., soybean oil, sunflower seed oil, peanut oil, and coconut oil), fatty acid (e.g., palmitic acid, stearic acid, and linoleic acid), alcohol (e.g., glycerol and ethanol), and organic acid (e.g., acetic acid), as a carbon source; at least one selected from nitrogen-containing organic compounds (e.g., peptone, yeast extract, meat juice, malt extract, corn solution, soybean meal powder, and urea), inorganic compounds (e.g., ammonium sulfate, ammonium chloride, ammonium phosphate, ammonium carbonate, and ammonium nitrate), as a nitrogen source; at least one selected from potassium dihydrogen phosphate, dipotassium phosphate, or sodium-containing salt corresponding thereto, as a phosphorus source; and at least one selected from other essential growth-stimulating substances, such as metal salts (e.g., magnesium sulfate or iron sulfate), amino acids, and/or vitamins, without being limited thereto.

In the step of recovering the L-amino acid (e.g., L-lysine, L-arginine, or a combination thereof), the desired amino acid may be collected from the medium, the culture, or the microorganisms, using a suitable method known in the art according to the culturing method. By way of example, the recovering step may be carried out using at least one method selected from centrifugation, filtration, anion exchange chromatography, crystallization, and HPLC, and the desired acrylic acid can be recovered from the medium or microorganism using any suitable method known in the art. The method may further comprise a purification step prior to, simultaneously with, or subsequent to the recovering step.

Advantageous Effects

Introduction of a mutation into endogenous lysE gene makes a lysine producing strain increase in lysine production potential of L-amino acid (e.g., L-lysine, L-arginine, or a combination thereof).

MODE FOR INVENTION

Hereinafter, the present disclosure will be described in more detail with examples, but these examples are only for illustrative purpose and are not intended to limit the scope of the disclosure. It is obvious to a person skilled in the art that the examples described below may be modified without departing from the spirit of the disclosure.

Example 1

Construction of Vector Library for Introduction of Mutation into ORF of lysE Gene To find enzymes having improved L-lysine exporting ability, a vector library for obtaining mutated lysE genes were constructed as follows.

Using GenemorphII Random Mutagenesis Kit (Stratagene), mutations were introduced into DNA fragments including lysE gene (711 bp; SEQ ID NO: 2), wherein 0 to 4.5 mutations/kb of the DNA fragment were introduced. Error-prone PCR was performed using a genomic DNA of *Corynebacterium glutamicum* ATCC 13032 (WT) as a template and using primers of SEQ ID NOS: 5 and 6 in Table 1. A PCR were performed for a reaction solution comprising genomic DNA (500 ng) of WT strain, primers (each 125 ng), Mutazyme II reaction buffer (1×), dNTP mix (40 mM), and Mutazyme II DNA polymerase (2.5 U) by 30 cycles of denaturing at 94° C. for 2 minutes, denaturing at 94° C. for 1 minute, annealing at 56° C. for 1 minute, and polymerizing at 72° C. for 30 seconds, and followed by polymerizing at 72° C. for 10 minutes. The DNA fragments obtained as above were reacted with restriction enzyme BamHI-HF (NEB) at 37° C. for 1 hour, ligated with pECCG117 vector (KR patent no. 10-0057684) which is treated with CIP (NEB) enzyme at 37° C. for 30 minutes, transformed into *E. coli* DH5α, and then, plated on LB solid medium supplemented with kanamycin (25 mg/l).

After selecting 20 colonies of transformants, plasmids were obtained and subject to nucleic acid sequence analysis, to confirm that mutations were introduced into various loci with frequency of 0.5 mutations/kb. Finally, about 10,000 colonies of the transformed *E. coli* were collected, and plasmids were extracted therefrom using plasmid prep kit (QIAGEN) and named as p117-lysE(mt) library. In addition, a vector wherein a wild-type lysE is introduced into pECCG117 vector was prepared as a control for screening. Wild-type lysE gene fragments were obtained by PCR using primers of SEQ ID NOS: 5 and 6, to prepare p117-lysE(WT) vector as described as above. The PCR was performed as follows; denaturation at 94° C. for 2 minutes; 30 cycles of denaturation at 94° C. for 1 minute, annealing at 56° C. for 1 minute, and polymerization at 72° C. for 30 seconds, and followed by polymerization at 72° C. for 10 minutes.

The nucleic acid sequences of the used primers are summarized in Table 1:

TABLE 11

| primer | Nucleic acid sequence (5' →' ') |
| --- | --- |
| SEQ ID NO: 5 | CGGGATCCATGGTGATCATGGAAATCTTCATTAC |
| SEQ ID NO: 6 | AAGGATCCCTAACCCATCAACATCAGTTTG |

Example 2

Generation and Screening of Strain Introduced with Vector Library

For generating strains wherein lysE gene was deleted from wild-type *Corynebacterium glutamicum* ATCC13032, a vector for lysE gene deletion was prepared. Specifically, a recombinant vector was prepared by ligating DNA fragments (each 600 bp) located at 5' and 3' ends of lysE gene with pDZ vector (U.S. Pat. No. 9,109,242 B2). Primers of SEQ ID NOS: 7 and 8 were synthesized based on the nucleic acid sequence (SEQ ID NO: 2) of lysE gene, and primers of SEQ ID NOS: 9 and 10 were synthesized corresponding to positions 600 bp away from them, respectively (Table 2).

PCR was performed using a genomic DNA of *Corynebacterium glutamicum* ATCC13032 as a template and using primers of SEQ ID NOS: 7 and 9, to prepare DNA fragments of 5' end of lysE gene. Similarly, PCR was performed using primers of SEQ ID NOS: 8 and 10, to prepare DNA fragments of 3' end of lysE gene. The PCR were performed as follows; denaturation at 94° C. for 2 minutes; 30 cycles of denaturation at 94° C. for 1 minute, annealing at 56° C. for 1 minute, and polymerization at 72° C. for 30 seconds, and followed by polymerization at 72° C. for 10 minutes. The amplified DNA fragments were purified using a PCR Purification kit (QIAGEN), and then, used as insertion DNA fragments for vector preparation.

The insertion DNA fragment amplified by PCR as above and pDZ vector (U.S. Pat. No. 9,109,242 B2) which was treated with restriction enzyme XbaI and heated at 65° C. for 20 minutes were ligated using Infusion Cloning Kit, transformed into *E. coli* DH5α, and then, smeared on LB solid medium supplemented with kanamycin (25 mg/l). After selecting a colony transformed with a vector in which the target gene was inserted, by PCR using primers of SEQ ID NOS: 7 and 8, a plasmid was obtained therefrom by a conventional method for plasmid extraction, and named pDZ-ΔlysE.

The nucleic acid sequences of the used primers are summarized in Table 2:

TABLE 2

| Primer | Nucleic acid sequence (5' -> 3') |
| --- | --- |
| SEQ ID NO: 7 | GTACCCGGGGATCCTCTAGAGTCTGGAAAGGCTCTTTACG |
| SEQ ID NO: 8 | GCCTGCAGGTCGACTCTAGATCTAGTTTCCCATCAACCATGT |
| SEQ ID NO: 9 | AAGTACTTCCATAGGTCACGTTTTCGCGGGTTTTGGAATC |
| SEQ ID NO: 10 | GATTCCAAAACCCGCGAAAACGTGACCTATGGAAGTACTT |

The prepared vector pDZ-ΔlysE was transformed into *Corynebacterium glutamicum* ATCC13032 by electric pulse method (Van der Rest et al., Appl. Microbiol. Biotecnol. 52:541-545, 1999), to prepare a mutated strain wherein lysE gene was deletion by homologous chromosome recombination. The obtained strain in which wherein lysE gene was deletion was named as *Corynebacterium glutamicum* 13032:: ΔlysE.

The 13032:: ΔlysE strain was transformed with p117-lysE (mt) library prepared in Example 1 by electric pulse method, and smeared on complex plate medium supplemented with kanamycin (25 mg/l), to obtain about 1,000 colonies. To prepare control, 13032:: ΔlysE strain was transformed with p117-lysE(WT) vector as described above.

<Complex Plate Medium (pH 7.0)>

Glucose 10 g, Peptone 10 g, Beef extract 5 g, Yeast extract 5 g, Brain Heart Infusion 18.5 g, NaCl 2.5 g, Urea 2 g, Sorbitol 91 g, agar 20 g (per liter of distilled water)

The obtained 13032:: ΔlysE p117(lysE(WT)) (control) and 13032:: ΔlysE_p117(lysE(mt)) libraries were respectively inoculated on 96-Deep Well Plate-Dome (Bioneer) including 400 ul of seed medium, and cultured in plate shaking incubator (TAITEC) under the conditions of 32° C. and 12000 rpm for about 12 hours.

<Seed Medium (pH 7.0)>

Glucose 20 g, Peptone 10 g, Yeast extract 5 g, Urea 1.5 g, $KH_2PO_4$ 4 g, $K_2HPO_4$ 8 g, $MgSO_4·7H_2O$ 0.5 g, Biotin 100 µg, Thiamine HCl 1,000 µg, Calcium-pantothenate 2,000 µg, Nicotinamide 2,000 µg (per liter of distilled water)

1000 colonies incubated above were serially diluted with complex plate medium supplemented with 100 g/L of L-lysine hydrochloride, and subjected to MIC (minimum inhibitory concentration) test, thereby obtaining 9 colonies having significantly increased MIC compared to the control strain. Each colony was subjected to secondary screening. Each colony was cultured on 96-Deep Well Plate-Dome (Bioneer) including 400 ul of seed medium, and cultured in plate shaking incubator (TAITEC) under the conditions of 32° C. and 12000 rpm for about 12 hours. The secondary screening was performed by adjusting the initial optical density (OD) of the finally cultured colonies as a same value, serial dilution with complex plate medium supplemented with 100 g/L of L-lysine hydrochloride, and MIC test. As a result, one colony having significantly increased MIC compared to the control strain, in which wild-type lysE gene was introduced, was selected and named as 13032:: lysE(mt), which was used in the examples below.

Example 3

Sequencing of Mutated lysE Gene

To analyze the nucleic acid sequences of genes inserted into strain 13032:: lysE(mt) selected in Example 2, a gene fragment was amplified by PCR using primers of SEQ ID NOS: 11 and 12. The PCR was performed under the same conditions of Example 1, and the amplified DNA fragment was obtained using GeneAll Expin GEL SV kit (Seoul, KOREA) and subjected to nucleic acid sequence analysis.

The nucleic acid sequences of the used primers are summarized in Table 3:

TABLE 3

| Primer | Nucleic acid sequence (5' -> 3') |
| --- | --- |
| SEQ ID NO: 11 | CCTTCGAAGCTGCCTTCATC |
| SEQ ID NO: 12 | CTGGACAACAGCCTTGATTC |

The nucleic acid sequence analysis result of the amplified gene indicates that 13032:: lysE(mt) strain includes mutated lysE gene in which the nucleic acid sequence of positions 193~195 from the start codon of lysE gene ORF, "AAT" (WT), is substituted with "GAA", thereby coding a L-lysine exporter mutant in which the amino acid residue at $65^{th}$ position from N-terminus of wild-type sequence (SEQ ID NO: 1), asparagine(N), is substituted with glutamic acid(E).

Example 4

Preparation of Vector for Introducing Mutated lysE Gene and Strain in which the Mutated lysE Gene Introduced In order to introduce N65E mutation which was confirmed in Example 3, recombinant vectors were prepared as follows. Using genomic DNA extracted from WT strain (ATCC13032) as a template, primers of SEQ ID NOS: 13 and 14 shown in Table 4 were synthesized, wherein the restriction site of restriction enzyme XbaI was inserted into 5' fragment and 3' fragment which are about 600 bp away from the region of positions 193~195 of lysE gene (SEQ ID NO: 2) in direction of upstream and downstream, respectively. In addition, primers of SEQ ID NOS: 15 and 16 for introducing nucleotide substitution mutations at positions 600 bp away from both end of the region.

The nucleic acid sequences of the used primers are summarized in Table 4:

TABLE 4

| Primer | Nucleic acid sequence (5' -> 3') |
| --- | --- |
| SEQ ID NO: 13 | GTACCCGGGGATCCTCTAGAGCTCCACCCCAAGAAGCT |

TABLE 4-continued

| Primer | Nucleic acid sequence (5' -> 3') |
|---|---|
| SEQ ID NO: 14 | GCCTGCAGGTCGACTCTAGACGAGTTGGAGGCGATCG |
| SEQ ID NO: 15 | AGCACGATCGGCGCGGCTTCGGACAAAAGATCAACGCCC |
| SEQ ID NO: 16 | GCGTTGATCTTTTGTCCGAAGCCGCGCCGATCGTG |

Specifically, recombinant vectors were prepared by ligating DNA fragments (each 600 bp) located at 5' and 3' ends of lysE gene with pDZ vector (U.S. Pat. No. 9,109,242 B2). A PCR was performed using a genomic DNA of WT(wild-type) strain as a template, and using primers of SEQ ID NOS: 13 and 15, to prepare 5' end gene fragment of lysE gene (positioned at 5' end of lysE gene). The PCR was performed as follows; denaturation at 94° C. for 2 minutes; 30 cycles of denaturation at 94° C. for 1 minute, annealing at 56° C. for 1 minute, and polymerization at 72° C. for 30 seconds, and followed by polymerization at 72° C. for 10 minutes. In the same manner, a PCR was performed using primers of SEQ ID NOS: 14 and 16, to prepare 3' end fragment of lysE gene (positioned at 3' end of lysE gene). The amplified DNA fragments were purified using a PCR Purification kit (QIAGEN), and then, used as insertion DNA fragments for vector preparation.

The insertion DNA fragment amplified by PCR as above and pDZ vector which was treated with restriction enzyme XbaI and heated at 65° C. for 20 minutes were ligated using Infusion Cloning Kit, and transformed into E. coli DH5α. Then, the transformed strains were smeared on LB solid medium supplemented with kanamycin (25 mg/L). After selecting a colony transformed with a vector in which the target gene was inserted through PCR using primers of SEQ ID NOS: 13 and 14, a plasmid was obtained therefrom by a conventional method for plasmid extraction, and named pDZ-lysE(N65E).

The prepared vector pDZ-lysE(N65E) was transformed into Corynebacterium glutamicum KCCM11016P strain (KR Patent No. 10-0159812) having lysine producing potential by electric pulse method. Such obtained strain, wherein a heterologous nucleotide substitution mutation (N65E) is introduced into lysE gene, was named as KCCM11016P::lysE(N65E).

Example 5

Assay for L-Lysine Production Potential of lysE(N65E) Mutant Strains

The KCCM11016P::lysE(N65E) strain prepared in Example 4 and parent strain KCCM11016P(N65) were cultured in the following manner so as to measure optical density (OD) values, L-lysine production yields, and sugar consumption rates. First, each strain was inoculated into a 250 ml corner-baffle flask containing 25 ml of a seed medium and then cultured at 30° C. for 20 hours with shaking at 200 rpm. Thereafter, 1 ml of the seed culture solution was inoculated into a 250 ml corner-baffle flask containing 24 ml of a production medium and then cultured at 32° C. for 72 hours with shaking at 200 rpm. Compositions of the seed medium and the production medium were as follow, and the culture results are given in Table 4, below.
<Seed Medium (pH 7.0)>

Glucose 20 g, Peptone 10 g, Yeast extract 5 g, Urea 1.5 g, $KH_2PO_4$ 4 g, $K_2HPO_4$ 8 g, $MgSO_4·7H_2O$ 0.5 g, Biotin 100 μg, Thiamine HCl 1,000 μg, Calcium-pantothenate 2,000 μg, Nicotinamide 2,000 μg (per liter of distilled water)
<Production Medium (pH 7.0)>

Glucose 90 g, $(NH_4)_2SO_4$ 30 g, Soy protein 20 g, Sugar beet-derived molasses 10 g, $KH_2PO_4$ 1.1 g, $MgSO_4·7H_2O$ 1.2 g, Biotin 2 mg, Thiamine HCl 10 mg, Calcium-pantothenate 10 mg, Nicotinamide 30 mg, $MnSO_4$ 20 mg, $FeSO_4$ 20 mg, $ZnSO_4$ 1 mg, $CuSO_4$ 1 mg, $CaCO_3$ 30 g (per liter of distilled water)

TABLE 5

OD values (562 nm), L-lysine productivities, and sugar consumption rates of parent strain and lysE(N65E) mutant strain

| Strain | 24 hr OD | Final OD | Lys production yield (%) | Sugar consumption rate (g/hr) |
|---|---|---|---|---|
| KCCM11016P | 36.7 | 96.5 | 19.9 | 1.99 |
| KCCM11016P::lysE(N65E) | 31.0 | 87.9 | 22.3 | 1.96 |

Compared to parent strain KCCM11016P, KCCM11016P::lysE(N65E) mutant in which lysE gene mutation is introduced shows slightly decreased OD value and increased L-lysine production yield by about 12.1% maintaining similar sugar consumption rate. These results evidence that lysE(N65E) mutation which was selected in Example 2 is a mutation of enhancing exporting ability of L-lysine exporter. The strain KCCM11016P::lysE(N65E) (called as 'Corynebacterium glutamicum CM03-1012'), which has an enhanced lysine production potential, was deposited in the Korean Culture Center of Microorganisms located in Hongje-dong, Seodaemun-Gu, Seoul, Korea on Dec. 13, 2019 and given the accession number KCCM12641P.

Example 6

Preparation of Strains Including Mutated lysE Gene Encoding Amino Acid Sequences Comprising an Amino Acid Other than Asparagine at $65^{th}$ Position In the amino acid sequence of SEQ ID NO: 1, the $65^{th}$ amino acid was substituted by each of other amino acids (18 amino acids) than both of asparagine (wild-type) and glutamic acid of which activity was verified in Example 5. In order to introduce nucleotide substitution mutation for encoding each of such 18 heterologous amino acid substitution mutants, each recombinant vectors was prepared in the following manner.

Using genomic DNA extracted from WT strain (ATCC13032) as a template, primers of SEQ ID NOS: 17 to 52 (shown in Table 6) for introducing nucleotide substitution mutations into 5' fragment and 3' fragment which are about 600 bp away from the region of positions 193-195 of lysE gene in direction of upstream and downstream, were synthesized. Specifically, recombinant vectors were prepared by ligating DNA fragments (each 600 bp) located at 5' and 3' ends of lysE gene with pDZ vector (U.S. Pat. No. 9,109,242 B2). A PCR was performed using a genomic DNA of WT(wild-type) strain as a template, and using primers of SEQ ID NOS: 13 and 17, to prepare 5' end gene fragment of lysE gene (positioned at 5' end of lysE gene). The PCR was performed as follows; denaturation at 94° C. for 2 minutes; 30 cycles of denaturation at 94° C. for 1 minute, annealing at 56° C. for 1 minute, and polymerization at 72° C. for 30 seconds, and followed by polymerization at 72° C. for 10 minutes. In the same manner, a PCR was performed using primers of SEQ ID NOS: 14 and 18, to prepare 3' end fragment of lysE gene (positioned at 3' end of lysE gene). The amplified DNA fragments were purified using a PCR Purification kit (QIAGEN), and then, used as insertion DNA fragments for vector preparation.

The insertion DNA fragment amplified by PCR as above and pDZ vector which was treated with restriction enzyme XbaI and heated at 65° C. for 20 minutes were ligated using Infusion Cloning Kit, and transformed into E. coli DH5α. Then, the transformed strains were smeared on LB solid medium supplemented with kanamycin (25 mg/l). After selecting a colony transformed with a vector in which the target gene was inserted through PCR using primers of SEQ ID NOS: 13 and 14, a plasmid was obtained therefrom by a conventional method for plasmid extraction, and named pDZ-lysE(N65G).

In the same manner,
pDZ-lysE(N65A) was prepared using primers SEQ ID NOS: 13 and 19, and SEQ ID NOS: 14 and 20;
pDZ-lysE(N65V) was prepared using primers SEQ ID NOS: 13 and 21, and SEQ ID NOS: 14 and 22;
pDZ-lysE(N65L) was prepared using primers SEQ ID NOS: 13 and 23, and SEQ ID NOS: 14 and 24;
pDZ-lysE(N65I) was prepared using primers SEQ ID NOS: 13 and 25, and SEQ ID NOS: 14 and 26;
pDZ-lysE(N65F) was prepared using primers SEQ ID NOS: 13 and 27, and SEQ ID NOS: 14 and 28;
pDZ-lysE(N65P) was prepared using primers SEQ ID NOS: 13 and 29, and SEQ ID NOS: 14 and 30;
pDZ-lysE(N65M) was prepared using primers SEQ ID NOS: 13 and 31, and SEQ ID NOS: 14 and 32;
pDZ-lysE(N65W) was prepared using primers SEQ ID NOS: 13 and 33, and SEQ ID NOS: 14 and 34;
pDZ-lysE(N65S) was prepared using primers SEQ ID NOS: 13 and 35, and SEQ ID NOS: 14 and 36;
pDZ-lysE(N65T) was prepared using primers SEQ ID NOS: 13 and 37, and SEQ ID NOS: 14 and 38;
pDZ-lysE(N65Q) was prepared using primers SEQ ID NOS: 13 and 39, and SEQ ID NOS: 14 and 40;
pDZ-lysE(N65Y) was prepared using primers SEQ ID NOS: 13 and 41, and SEQ ID NOS: 14 and 42;
pDZ-lysE(N65C) was prepared using primers SEQ ID NOS: 13 and 43, and SEQ ID NOS: 14 and 44;
pDZ-lysE(N65D) was prepared using primers SEQ ID NOS: 13 and 45, and SEQ ID NOS: 14 and 46;
pDZ-lysE(N65H) was prepared using primers SEQ ID NOS: 13 and 47, and SEQ ID NOS: 14 and 48;
pDZ-lysE(N65K) was prepared using primers SEQ ID NOS: 13 and 49, and SEQ ID NOS: 14 and 50; and
pDZ-lysE(N65R) was prepared using primers SEQ ID NOS: 13 and 51, and SEQ ID NOS: 14 and 52.

The nucleic acid sequences of the used primers are summarized in Table 6:

TABLE 6

| Primer | Nucleic acid sequence (5' -> 3') |
| --- | --- |
| SEQ ID NO: 17 | AGCACGATCGGCGCGGCGCCGGACAAAAGATCAACGCCC |
| SEQ ID NO: 18 | GCGTTGATCTTTTGTCCGGCGCCGCGCCGATCGTG |
| SEQ ID NO: 19 | AGCACGATCGGCGCGGCAGCGGACAAAAGATCAACGCCC |

TABLE 6-continued

| Primer | Nucleic acid sequence (5' -> 3') |
| --- | --- |
| SEQ ID NO: 20 | GCGTTGATCTTTTGTCCGCTGCCGCGCCGATCGTG |
| SEQ ID NO: 21 | AGCACGATCGGCGCGGCGACGGACAAAAGATCAACGCCC |
| SEQ ID NO: 22 | GCGTTGATCTTTTGTCCGTCGCCGCGCCGATCGTG |
| SEQ ID NO: 23 | AGCACGATCGGCGCGGCCAGGGACAAAAGATCAACGCCC |
| SEQ ID NO: 24 | GCGTTGATCTTTTGTCCCTGGCCGCGCCGATCGTG |
| SEQ ID NO: 25 | AGCACGATCGGCGCGGCGATGGACAAAAGATCAACGCCC |
| SEQ ID NO: 26 | GCGTTGATCTTTTGTCCATCGCCGCGCCGATCGTG |
| SEQ ID NO: 27 | AGCACGATCGGCGCGGCGAAGGACAAAAGATCAACGCCC |
| SEQ ID NO: 28 | GCGTTGATCTTTTGTCCTTCGCCGCGCCGATCGTG |
| SEQ ID NO: 29 | AGCACGATCGGCGCGGCTGGGGACAAAAGATCAACGCCC |
| SEQ ID NO: 30 | GCGTTGATCTTTTGTCCCCAGCCGCGCCGATCGTG |
| SEQ ID NO: 31 | AGCACGATCGGCGCGGCCATGGACAAAAGATCAACGCCC |
| SEQ ID NO: 32 | GCGTTGATCTTTTGTCCATGGCCGCGCCGATCGTG |
| SEQ ID NO: 33 | AGCACGATCGGCGCGGCCCAGGACAAAAGATCAACGCCC |
| SEQ ID NO: 34 | GCGTTGATCTTTTGTCCTGGGCCGCGCCGATCGTG |
| SEQ ID NO: 35 | AGCACGATCGGCGCGGCGGAGGACAAAAGATCAACGCCC |
| SEQ ID NO: 36 | GCGTTGATCTTTTGTCCTCCGCCGCGCCGATCGTG |
| SEQ ID NO: 37 | AGCACGATCGGCGCGGCGGTGGACAAAAGATCAACGCCC |
| SEQ ID NO: 38 | GCGTTGATCTTTTGTCCACCGCCGCGCCGATCGTG |
| SEQ ID NO: 39 | AGCACGATCGGCGCGGCCTGGGACAAAAGATCAACGCCC |
| SEQ ID NO: 40 | GCGTTGATCTTTTGTCCCAGGCCGCGCCGATCGTG |
| SEQ ID NO: 41 | AGCACGATCGGCGCGGCGTAGGACAAAAGATCAACGCCC |
| SEQ ID NO: 42 | GCGTTGATCTTTTGTCCTACGCCGCGCCGATCGTG |
| SEQ ID NO: 43 | AGCACGATCGGCGCGGCGCAGGACAAAAGATCAAC GCCC |
| SEQ ID NO: 44 | GCGTTGATCTTTTGTCCTGCGCCGCGCCGATCGTG |
| SEQ ID NO: 45 | AGCACGATCGGCGCGGCGTCGGACAAAAGATCAACGCCC |
| SEQ ID NO: 46 | GCGTTGATCTTTTGTCCGACGCCGCGCCGATCGTG |
| SEQ ID NO: 47 | AGCACGATCGGCGCGGCGTGGGACAAAAGATCAACGCCC |
| SEQ ID NO: 48 | GCGTTGATCTTTTGTCCCACGCCGCGCCGATCGTG |
| SEQ ID NO: 49 | AGCACGATCGGCGCGGCCTTGGACAAAAGATCAACGCCC |
| SEQ ID NO: 50 | GCGTTGATCTTTTGTCCAAGGCCGCGCCGATCGTG |

TABLE 6-continued

| Primer | Nucleic acid sequence (5' -> 3') |
|---|---|
| SEQ ID NO: 51 | AGCACGATCGGCGCGGCGCGGGACAAAAGATCAACGCCC |
| SEQ ID NO: 52 | GCGTTGATCTTTTGTCCCGCGCCGCGCCGATCGTG |

Each prepared vector was transformed into *Corynebacterium glutamicum* KCCM11016P strain (KR Patent No. 10-0159812) having lysine producing potential by electric pulse method. The 18 strains obtained above, wherein heterologous nucleotide substitution mutations are introduced into lysE gene, were named as KCCM11016P::lysE(N65G), KCCM11016P::lysE(N65A), KCCM11016P::lysE(N65V), KCCM11016P::lysE(N65L), KCCM11016P::lysE(N65I), KCCM11016P::lysE(N65F), KCCM11016P::lysE(N65VP), KCCM11016P::lysE(N65M), KCCM11016P::lysE(N65W), KCCM11016P::lysE(N65S), KCCM11016P::lysE(N65T), KCCM11016P::lysE(N65Q), KCCM11016P::lysE(N65Y), KCCM11016P::lysE(N65C), KCCM11016P::lysE(N65D), KCCM11016P::lysE(N65H), KCCM11016P::lysE(N65K), and KCCM11016P::lysE(N65R), respectively.

Example 7

Assay for L-lysine Production Potential of lysE Mutant Strains

The parent strain KCCM11016P(N65), KCCM11016P::lysE(N65E) strain prepared in Example 4, and 18 strains prepared in Example 6 were cultured in the same manner with Example 5 so as to measure OD values, L-lysine production yields, and sugar consumption rates. The obtained results are shown in Table 7:

TABLE 7

OD values (562 nm), L-lysine productivities, and sugar consumption rates of parent strain and lysE mutant strains

| Strain | 24 hr OD | Final OD | Lys production yield (%) | Sugar consumption rate (g/hr) |
|---|---|---|---|---|
| KCCM11016P | 36.5 | 96.8 | 19.8 | 2.00 |
| KCCM11016P::lysE(N65E) | 29.8 | 88.0 | 22.9 | 1.97 |
| KCCM11016P::lysE(N65G) | 31.0 | 82.2 | 21.8 | 2.04 |
| KCCM11016P::lysE(N65A) | 30.3 | 88.4 | 23.3 | 2.04 |
| KCCM11016P::lysE(N65V) | 29.5 | 84.2 | 23.9 | 2.08 |
| KCCM11016P::lysE(N65L) | 30.3 | 85.2 | 23.3 | 1.90 |
| KCCM11016P::lysE(N65I) | 31.1 | 83.9 | 22.8 | 2.01 |
| KCCM11016P::lysE(N65F) | 30.8 | 84.5 | 23.1 | 2.05 |
| KCCM11016P::lysE(N65P) | 29.9 | 84.6 | 22.4 | 2.01 |
| KCCM11016P::lysE(N65M) | 31.0 | 87.0 | 21.3 | 2.07 |
| KCCM11016P::lysE(N65W) | 30.8 | 86.1 | 22.5 | 2.00 |
| KCCM11016P::lysE(N65S) | 35.3 | 93.6 | 21.7 | 1.99 |
| KCCM11016P::lysE(N65T) | 34.9 | 92.4 | 21.4 | 1.96 |
| KCCM11016P::lysE(N65Q) | 32.8 | 97.0 | 21.2 | 2.08 |
| KCCM11016P::lysE(N65Y) | 31.5 | 96.5 | 21.8 | 2.01 |
| KCCM11016P::lysE(N65C) | 32.0 | 95.8 | 22.0 | 1.99 |
| KCCM11016P::lysE(N65D) | 31.2 | 90.4 | 22.9 | 2.05 |
| KCCM11016P::lysE(N65H) | 32.1 | 83.8 | 23.6 | 1.95 |
| KCCM11016P::lysE(N65K) | 29.4 | 86.4 | 23.7 | 2.06 |
| KCCM11016P::lysE(N65R) | 31.8 | 86.0 | 24.1 | 2.02 |

Compared to parent strain KCCM11016P, KCCM11016P::lysE(N65E) mutant selected in Example 5 shows slightly decreased OD value and increased L-lysine production yield by about 15.7% maintaining similar sugar consumption rate, and all 18 strains prepared in Example 6 also show equal or slightly decreased OD value and increased L-lysine production yield by maximum about 21.7% maintaining similar sugar consumption rate, These results evidence that the position corresponding to $65^{th}$ amino acid asparagine in lysE is important in enhancing L-lysine exporting ability.

Example 8

Assay for L-Lysine Production Potential of Selected lysE Mutant Strains

In order to assay effects of the lysE gene mutations on other parent strain having L-lysine production potential, another L-lysine producing strain *Corynebacterium glutamicum* KCCM10770P(N65) (U.S. Pat. No. 9,109,242 B2) was used as a parent strain for introducing each of 4 mutations including lysE(N65E) mutation selected in Example 3 and 3 mutations selected from mutations of Example 7. Each of 4 vectors, pDZ-lysE(N65E) prepared in Example 4, and pDZ-lysE(N65K), pDZ-lysE(N65Q), and pDZ-lysE(N65L) prepared in Example 6 was transformed into *Corynebacterium glutamicum* KCCM10770P strain by electric pulse method, to prepare 4 mutant strains, KCCM10770P::lysE(N65E), KCCM10770P::lysE(N65K), KCCM10770P::lysE(N65Q), and KCCM10770P::lysE(N65L). The parent strain KCCM10770P, and the 4 mutant strains were cultured in the same manner with Example 5 so as to measure OD values, L-lysine production yields, and sugar consumption rates. The obtained results are shown in Table 8:

TABLE 8

OD values (562 nm), L-lysine productivities, and sugar consumption rates of parent strain and lysE mutant strains

| 균주 | 24 hr OD | Final OD | Lys production yield (%) | Sugar consumption rate (g/hr) |
|---|---|---|---|---|
| KCCM10770P | 68.6 | 58.6 | 7.8 | 3.27 |
| KCCM10770P::lysE(N65E) | 99.3 | 116.8 | 20.3 | 3.24 |
| KCCM10770P::lysE(N65K) | 87.0 | 69.0 | 9.2 | 3.26 |
| KCCM10770P::lysE(N65Q) | 82.4 | 69.2 | 8.4 | 3.39 |
| KCCM10770P::lysE(N65L) | 79.2 | 67.1 | 8.1 | 3.38 |

As shown in Table 8, the mutant strain prepared by introducing the mutation selected in Example 5, i.e., the amino acid substitution of $65^{th}$ amino acid of SEQ ID NO: 1 with glutamic acid into lysine producing strain KCCM10770P (parent strain), shows similar sugar consumption rate, increased OD value, and increased L-lysine production yield by about 160.3%, compared to those of the parent strain. In addition, the additional 3 mutant strains also show similar sugar consumption rate, increased OD value, and increased L-lysine production yield by about 3.8% to 17.9%, compared to those of the parent strains. These results suggest that, although the amount of change in OD and increase in L-lysine production yield are different depending on parent strains, the position of the $65^{th}$ amino acid of lysE, asparagine, plays an important role in improving L-lysine exporting ability, which is consistent with the results in Example 7.

Example 9

Assay for L-Arginine Production Potential of Selected lysE Mutant Strain

In order to assay the effect of the mutated L-lysine exporter on L-arginine exporting ability, the pDZ-lysE (N65E) vector prepared in Example 4 was transformed into L-arginine producing strain, *Corynebacterium glutamicum* KCCM10741P(N65) strain (U.S. Pat. No. 8,034,602 B2), by electric pulse method. Such prepared mutant strain, wherein the heterologous nucleotide substitution mutation was introduced into lysE gene, was named as KCCM10741P::lysE (N65E). The parent strain KCCM10741P and the prepared KCCM10741P::lysE(N65E) strain were cultured in the following manner so as to measure OD values, L-arginine production yields, and sugar consumption rates. First, each strain was inoculated into a 250 ml corner-baffle flask containing 25 ml of a seed medium and then cultured at 30° C. for 20 hours with shaking at 200 rpm. Thereafter, 1 ml of the seed culture solution was inoculated into a 250 ml corner-baffle flask containing 24 ml of a production medium and then cultured at 32° C. for 72 hours with shaking at 200 rpm. Compositions of the seed medium and the production medium were as follow, and the culture results are given in Table 9, below.

<Seed Medium (pH 7.0)>

Glucose 20 g, Peptone 10 g, Yeast extract 5 g, Urea 1.5 g, KH$_2$PO$_4$ 4 g, K$_2$HPO$_4$ 8 g, MgSO$_4$·7H$_2$O 0.5 g, Biotin 100 µg, Thiamine HCl 1 mg, Calcium-pantothenate 2 mg, Nicotinamide 2 mg (per liter of distilled water)

<Production Medium (pH 7.0)>

Glucose 60 g, Ammonium sulfate 30 g, KH$_2$PO$_4$ 1 g, MgSO$_4$·7H$_2$O 2 g, CSL (corn steep liquor) 15 g, NaCl 10 g, Yeast extract 5 g, Biotin 100 mg (per liter of distilled water).

TABLE 9

OD values (562 nm), lysine productivities, and sugar consumption rates of parent strain and lysE(N65E) mutant strain

| Strain | 24 hr OD | Final OD | Arg production yield (%) | Sugar consumption rate (g/hr) |
|---|---|---|---|---|
| KCCM10741P | 32.2 | 76.5 | 5.1% | 0.89 |
| KCCM10741P::lysE(N65E) | 31.8 | 77.8 | 5.7% | 0.88 |

As shown in Table 9, compared to parent strain KCCM10741P, lysE mutation introduced KCCM10741P::lysE(N65E) strain shows similar OD value and sugar consumption rate, and increased L-arginine production yield by about 11.8%. These results suggest that lysE(N65E) mutation is a mutation capable of enhancing L-arginine exporting ability as well as L-lysine exporting ability.

From the above description, it will be understood by those skilled in the art that the present disclosure may be embodied in other specific forms without departing from the spirit or essential characteristics thereof. In this regard, it should be understood that the embodiments described above are illustrative in all aspects and not restrictive. The scope of the present application is to be interpreted as being within the scope of the present application, all changes or modifications derived from the meaning and scope of the appended claim s and from their equivalents rather than the detailed description.

The invention claimed is:

1. A polypeptide having L-lysine exporter activity, comprising an amino acid sequence having at least 90% sequence identity to SEQ ID NO: 1, wherein the polypeptide comprises an amino acid residue other than asparagine at a position corresponding to the position 65 of SEQ ID NO: 1.

2. The polypeptide of claim 1, wherein the residue at the position corresponding to the position 65 of SEQ ID NO: 1 is substituted with glutamic acid, arginine, valine, lysine, histidine, leucine, alanine, phenylalanine, aspartic acid, isoleucine, tryptophan, proline, cysteine, tyrosine, serine, threonine, methionine, glutamine, or glycine.

3. A polynucleotide encoding the polypeptide of claim 1.

4. The polynucleotide of claim 3, represented by the nucleic acid sequence of SEQ ID NO: 4.

5. A recombinant vector comprising the polynucleotide of claim 3.

6. An L-amino acid producing microorganism, comprising the polypeptide of claim 1, a polynucleotide encoding the polypeptide, or a recombinant vector comprising the polynucleotide.

7. The L-amino acid producing microorganism of claim 6, wherein the polypeptide has activity of L-amino acid exporter.

8. The L-amino acid producing microorganism of claim 6, wherein the polypeptide or the polynucleotide is derived from a microorganism belongs to the same species of the L-amino acid producing microorganism.

9. The L-amino acid producing microorganism of claim 6, wherein the microorganism belongs to the genus of *Corynebacterium* or *Escherichia*.

10. The L-amino acid producing microorganism of claim 6, wherein the microorganism is *Corynebacterium glutamicum* or *Escherichia coli*.

11. The L-amino acid producing microorganism of claim 6, having an improved exporting ability or production potential of L-amino acid, compared to an unmodified microorganism.

12. The L-amino acid producing microorganism of claim 7, wherein the L-amino acid is L-lysine, L-arginine, or a combination thereof.

13. A method of producing an L-amino acid, the method comprising:
culturing the L-amino acid producing microorganism of claim 7 in a medium.

14. The method of producing an L-amino acid of claim 13, further comprising, after the step of culturing,
recovering the L-amino acid from the cultured microorganism, the medium, or both of them.

15. The method of producing an L-amino acid of claim 13, wherein the L-amino acid is L-lysine, L-arginine, or a combination thereof.

* * * * *

SEQUENCE LISTING

```
<160> NUMBER OF SEQ ID NOS: 52

<210> SEQ ID NO 1
<211> LENGTH: 236
<212> TYPE: PRT
<213> ORGANISM: Artificial Sequence
<220> FEATURE:
<223> OTHER INFORMATION: lysE protein

<400> SEQUENCE: 1

Met Val Ile Met Glu Ile Phe Ile Thr Gly Leu Leu Leu Gly Ala Ser
1               5                   10                  15

Leu Leu Leu Ser Ile Gly Pro Gln Asn Val Leu Val Ile Lys Gln Gly
            20                  25                  30

Ile Lys Arg Glu Gly Leu Ile Ala Val Leu Leu Val Cys Leu Ile Ser
        35                  40                  45

Asp Val Phe Leu Phe Ile Ala Gly Thr Leu Gly Val Asp Leu Leu Ser
    50                  55                  60

Asn Ala Ala Pro Ile Val Leu Asp Ile Met Arg Trp Gly Gly Ile Ala
65                  70                  75                  80

Tyr Leu Leu Trp Phe Ala Val Met Ala Ala Lys Asp Ala Met Thr Asn
                85                  90                  95

Lys Val Glu Ala Pro Gln Ile Ile Glu Glu Thr Glu Pro Thr Val Pro
            100                 105                 110

Asp Asp Thr Pro Leu Gly Gly Ser Ala Val Ala Thr Asp Thr Arg Asn
        115                 120                 125

Arg Val Arg Val Glu Val Ser Val Asp Lys Gln Arg Val Trp Val Lys
    130                 135                 140

Pro Met Leu Met Ala Ile Val Leu Thr Trp Leu Asn Pro Asn Ala Tyr
145                 150                 155                 160
```

Leu Asp Ala Phe Val Phe Ile Gly Gly Val Gly Ala Gln Tyr Gly Asp
                165                 170                 175

Thr Gly Arg Trp Ile Phe Ala Ala Gly Ala Phe Ala Ala Ser Leu Ile
            180                 185                 190

Trp Phe Pro Leu Val Gly Phe Gly Ala Ala Ala Leu Ser Arg Pro Leu
        195                 200                 205

Ser Ser Pro Lys Val Trp Arg Trp Ile Asn Val Val Ala Val Val
    210                 215                 220

Met Thr Ala Leu Ala Ile Lys Leu Met Leu Met Gly
225                 230                 235

<210> SEQ ID NO 2
<211> LENGTH: 711
<212> TYPE: DNA
<213> ORGANISM: Artificial Sequence
<220> FEATURE:
<223> OTHER INFORMATION: lysE gene

<400> SEQUENCE: 2
atggtgatca tggaaatctt cattacaggt ctgcttttgg gggccagtct tttactgtcc      60
atcggaccgc agaatgtact ggtgattaaa caaggaatta agcgcgaagg actcattgcg     120
gttcttctcg tgtgtttaat tctgacgtc tttttgttca tcgccggcac cttgggcgtt     180
gatcttttgt ccaatgccgc gccgatcgtg ctcgatatta tgcgctgggg tggcatcgct     240
tacctgttat ggtttgccgt catggcagcg aaagacgcca tgacaaacaa ggtggaagcg     300
ccacagatca ttgaagaaac agaaccaacc gtgcccgatg acacgccttt ggcggttcg      360 gcggtggcca ctgacacgcg caaccgggtg cgggtggagg tgagcgtcga taagcagcgg     420
gtttgggtaa agcccatgtt gatggcaatc gtgctgacct ggttgaaccc gaatgcgtat     480
ttggacgcgt ttgtgtttat cggcggcgtc ggcgcgcaat acggcgacac cggacggtgg     540
attttcgccg ctggcgcgtt cgcggcaagc ctgatctggt tcccgctggt gggtttcggc     600
gcagcagcat tgtcacgccc gctgtccagc cccaaggtgt ggcgctggat caacgtcgtc     660
gtggcagttg tgatgaccgc attggccatc aaactgatgt tgatgggtta g              711

<210> SEQ ID NO 3
<211> LENGTH: 236
<212> TYPE: PRT
<213> ORGANISM: Artificial Sequence
<220> FEATURE:
<223> OTHER INFORMATION: lysE protein mutant (N65E)

<400> SEQUENCE: 3

Met Val Ile Met Glu Ile Phe Ile Thr Gly Leu Leu Leu Gly Ala Ser
1               5                   10                  15

Leu Leu Leu Ser Ile Gly Pro Gln Asn Val Leu Val Ile Lys Gln Gly
            20                  25                  30

Ile Lys Arg Glu Gly Leu Ile Ala Val Leu Leu Val Cys Leu Ile Ser
        35                  40                  45

Asp Val Phe Leu Phe Ile Ala Gly Thr Leu Gly Val Asp Leu Leu Ser
    50                  55                  60

Glu Ala Ala Pro Ile Val Leu Asp Ile Met Arg Trp Gly Gly Ile Ala
65                  70                  75                  80

Tyr Leu Leu Trp Phe Ala Val Met Ala Ala Lys Asp Ala Met Thr Asn
            85                  90                  95

Lys Val Glu Ala Pro Gln Ile Ile Glu Glu Thr Glu Pro Thr Val Pro
        100                 105                 110

```
Asp Asp Thr Pro Leu Gly Gly Ser Ala Val Ala Thr Asp Thr Arg Asn
        115                 120                 125

Arg Val Arg Val Glu Val Ser Val Asp Lys Gln Arg Val Trp Val Lys
    130                 135                 140

Pro Met Leu Met Ala Ile Val Leu Thr Trp Leu Asn Pro Asn Ala Tyr
145                 150                 155                 160

Leu Asp Ala Phe Val Phe Ile Gly Val Gly Ala Gln Tyr Gly Asp
                165                 170                 175

Thr Gly Arg Trp Ile Phe Ala Ala Gly Ala Phe Ala Ala Ser Leu Ile
            180                 185                 190

Trp Phe Pro Leu Val Gly Phe Gly Ala Ala Ala Leu Ser Arg Pro Leu
                195                 200                 205

Ser Ser Pro Lys Val Trp Arg Trp Ile Asn Val Val Ala Val Val
    210                 215                 220

Met Thr Ala Leu Ala Ile Lys Leu Met Leu Met Gly
225                 230                 235
```

<210> SEQ ID NO 4
<211> LENGTH: 711
<212> TYPE: DNA
<213> ORGANISM: Artificial Sequence
<220> FEATURE:
<223> OTHER INFORMATION: lysE gene mutant encoding lysE protein mutant
      (N65E)

<400> SEQUENCE: 4

```
atggtgatca tggaaatctt cattacaggt ctgcttttgg gggccagtct tttactgtcc      60
atcggaccgc agaatgtact ggtgattaaa caaggaatta agcgcgaagg actcattgcg     120
gttcttctcg tgtgtttaat ttctgacgtc tttttgttca tcgccggcac cttgggcgtt     180
gatcttttgt ccgaagccgc gccgatcgtg ctcgatatta tgcgctgggg tggcatcgct     240
tacctgttat ggtttgccgt catggcagcg aaagacgcca tgacaaacaa ggtggaagcg     300
ccacagatca ttgaagaaac agaaccaacc gtgcccgatg acacgccttt ggcgggttcg     360
gcggtggcca ctgacacgcg caaccgggtg cgggtggagg tgagcgtcga taagcagcgg     420
gtttgggtaa agcccatgtt gatggcaatc gtgctgacct ggttgaaccc gaatgcgtat     480
ttggacgcgt ttgtgtttat cggcggcgtc ggcgcgcaat acggcgacac cggacggtgg     540
attttcgccg ctggcgcgtt cgcggcaagc ctgatctggt tcccgctggt gggtttcggc     600
gcagcagcat tgtcacgccc gctgtccagc cccaaggtgt ggcgctggat caacgtcgtc     660
gtggcagttg tgatgaccgc attggccatc aaactgatgt tgatgggtta g             711
```

<210> SEQ ID NO 5
<211> LENGTH: 34
<212> TYPE: DNA
<213> ORGANISM: Artificial Sequence
<220> FEATURE:
<223> OTHER INFORMATION: primer

<400> SEQUENCE: 5

```
cgggatccat ggtgatcatg gaaatcttca ttac                                  34
```

<210> SEQ ID NO 6
<211> LENGTH: 30
<212> TYPE: DNA
<213> ORGANISM: Artificial Sequence
<220> FEATURE:
<223> OTHER INFORMATION: primer

<400> SEQUENCE: 6
aaggatccct aacccatcaa catcagtttg                                   30

<210> SEQ ID NO 7
<211> LENGTH: 40
<212> TYPE: DNA
<213> ORGANISM: Artificial Sequence
<220> FEATURE:
<223> OTHER INFORMATION: primer

<400> SEQUENCE: 7
gtacccgggg atcctctaga gtctggaaag gctctttacg                        40

<210> SEQ ID NO 8
<211> LENGTH: 42
<212> TYPE: DNA
<213> ORGANISM: Artificial Sequence
<220> FEATURE:
<223> OTHER INFORMATION: primer

<400> SEQUENCE: 8
gcctgcaggt cgactctaga tctagtttcc catcaaccat gt                     42

<210> SEQ ID NO 9
<211> LENGTH: 40
<212> TYPE: DNA
<213> ORGANISM: Artificial Sequence
<220> FEATURE:
<223> OTHER INFORMATION: primer

<400> SEQUENCE: 9
aagtacttcc ataggtcacg ttttcgcggg ttttggaatc                        40

<210> SEQ ID NO 10
<211> LENGTH: 40
<212> TYPE: DNA
<213> ORGANISM: Artificial Sequence
<220> FEATURE:
<223> OTHER INFORMATION: primer

<400> SEQUENCE: 10
gattccaaaa cccgcgaaaa cgtgacctat ggaagtactt                        40

<210> SEQ ID NO 11
<211> LENGTH: 20
<212> TYPE: DNA
<213> ORGANISM: Artificial Sequence
<220> FEATURE:
<223> OTHER INFORMATION: primer

<400> SEQUENCE: 11
ccttcgaagc tgccttcatc                                              20

<210> SEQ ID NO 12
<211> LENGTH: 20
<212> TYPE: DNA
<213> ORGANISM: Artificial Sequence
<220> FEATURE:
<223> OTHER INFORMATION: primer

<400> SEQUENCE: 12
ctggacaaca gccttgattc                                              20

<210> SEQ ID NO 13

-continued

<210> SEQ ID NO 13
<211> LENGTH: 38
<212> TYPE: DNA
<213> ORGANISM: Artificial Sequence
<220> FEATURE:
<223> OTHER INFORMATION: primer

<400> SEQUENCE: 13
gtacccgggg atcctctaga gctccacccc aagaagct                    38

<210> SEQ ID NO 14
<211> LENGTH: 37
<212> TYPE: DNA
<213> ORGANISM: Artificial Sequence
<220> FEATURE:
<223> OTHER INFORMATION: primer

<400> SEQUENCE: 14
gcctgcaggt cgactctaga cgagttggag gcgatcg                     37

<210> SEQ ID NO 15
<211> LENGTH: 39
<212> TYPE: DNA
<213> ORGANISM: Artificial Sequence
<220> FEATURE:
<223> OTHER INFORMATION: primer

<400> SEQUENCE: 15
agcacgatcg gcgcggcttc ggacaaaaga tcaacgccc                   39

<210> SEQ ID NO 16
<211> LENGTH: 35
<212> TYPE: DNA
<213> ORGANISM: Artificial Sequence
<220> FEATURE:
<223> OTHER INFORMATION: primer

<400> SEQUENCE: 16
gcgttgatct tttgtccgaa gccgcgccga tcgtg                       35

<210> SEQ ID NO 17
<211> LENGTH: 39
<212> TYPE: DNA
<213> ORGANISM: Artificial Sequence
<220> FEATURE:
<223> OTHER INFORMATION: primer

<400> SEQUENCE: 17
agcacgatcg gcgcggcgcc ggacaaaaga tcaacgccc                   39

<210> SEQ ID NO 18
<211> LENGTH: 35
<212> TYPE: DNA
<213> ORGANISM: Artificial Sequence
<220> FEATURE:
<223> OTHER INFORMATION: primer

<400> SEQUENCE: 18
gcgttgatct tttgtccggc gccgcgccga tcgtg                       35

<210> SEQ ID NO 19
<211> LENGTH: 39
<212> TYPE: DNA
<213> ORGANISM: Artificial Sequence
<220> FEATURE:
<223> OTHER INFORMATION: primer

<400> SEQUENCE: 19

```
agcacgatcg gcgcggcagc ggacaaaaga tcaacgccc          39

<210> SEQ ID NO 20
<211> LENGTH: 35
<212> TYPE: DNA
<213> ORGANISM: Artificial Sequence
<220> FEATURE:
<223> OTHER INFORMATION: primer

<400> SEQUENCE: 20
gcgttgatct tttgtccgct gccgcgccga tcgtg              35

<210> SEQ ID NO 21
<211> LENGTH: 39
<212> TYPE: DNA
<213> ORGANISM: Artificial Sequence
<220> FEATURE:
<223> OTHER INFORMATION: primer

<400> SEQUENCE: 21
agcacgatcg gcgcggcgac ggacaaaaga tcaacgccc          39

<210> SEQ ID NO 22
<211> LENGTH: 35
<212> TYPE: DNA
<213> ORGANISM: Artificial Sequence
<220> FEATURE:
<223> OTHER INFORMATION: primer

<400> SEQUENCE: 22
gcgttgatct tttgtccgtc gccgcgccga tcgtg              35

<210> SEQ ID NO 23
<211> LENGTH: 39
<212> TYPE: DNA
<213> ORGANISM: Artificial Sequence
<220> FEATURE:
<223> OTHER INFORMATION: primer

<400> SEQUENCE: 23
agcacgatcg gcgcggccag ggacaaaaga tcaacgccc          39

<210> SEQ ID NO 24
<211> LENGTH: 35
<212> TYPE: DNA
<213> ORGANISM: Artificial Sequence
<220> FEATURE:
<223> OTHER INFORMATION: primer

<400> SEQUENCE: 24
gcgttgatct tttgtccctg gccgcgccga tcgtg              35

<210> SEQ ID NO 25
<211> LENGTH: 39
<212> TYPE: DNA
<213> ORGANISM: Artificial Sequence
<220> FEATURE:
<223> OTHER INFORMATION: primer

<400> SEQUENCE: 25
agcacgatcg gcgcggcgat ggacaaaaga tcaacgccc          39

<210> SEQ ID NO 26
<211> LENGTH: 35
<212> TYPE: DNA
```

```
<213> ORGANISM: Artificial Sequence
<220> FEATURE:
<223> OTHER INFORMATION: primer

<400> SEQUENCE: 26
gcgttgatct tttgtccatc gccgcgccga tcgtg                          35

<210> SEQ ID NO 27
<211> LENGTH: 39
<212> TYPE: DNA
<213> ORGANISM: Artificial Sequence
<220> FEATURE:
<223> OTHER INFORMATION: primer

<400> SEQUENCE: 27
agcacgatcg gcgcggcgaa ggacaaaaga tcaacgccc                      39

<210> SEQ ID NO 28
<211> LENGTH: 35
<212> TYPE: DNA
<213> ORGANISM: Artificial Sequence
<220> FEATURE:
<223> OTHER INFORMATION: primer

<400> SEQUENCE: 28
gcgttgatct tttgtccttc gccgcgccga tcgtg                          35

<210> SEQ ID NO 29
<211> LENGTH: 39
<212> TYPE: DNA
<213> ORGANISM: Artificial Sequence
<220> FEATURE:
<223> OTHER INFORMATION: primer

<400> SEQUENCE: 29
agcacgatcg gcgcggctgg ggacaaaaga tcaacgccc                      39

<210> SEQ ID NO 30
<211> LENGTH: 35
<212> TYPE: DNA
<213> ORGANISM: Artificial Sequence
<220> FEATURE:
<223> OTHER INFORMATION: primer

<400> SEQUENCE: 30
gcgttgatct tttgtcccca gccgcgccga tcgtg                          35

<210> SEQ ID NO 31
<211> LENGTH: 39
<212> TYPE: DNA
<213> ORGANISM: Artificial Sequence
<220> FEATURE:
<223> OTHER INFORMATION: primer

<400> SEQUENCE: 31
agcacgatcg gcgcggccat ggacaaaaga tcaacgccc                      39

<210> SEQ ID NO 32
<211> LENGTH: 35
<212> TYPE: DNA
<213> ORGANISM: Artificial Sequence
<220> FEATURE:
<223> OTHER INFORMATION: primer

<400> SEQUENCE: 32
gcgttgatct tttgtccatg gccgcgccga tcgtg                          35
```

<210> SEQ ID NO 33
<211> LENGTH: 39
<212> TYPE: DNA
<213> ORGANISM: Artificial Sequence
<220> FEATURE:
<223> OTHER INFORMATION: primer

<400> SEQUENCE: 33
agcacgatcg gcgcggccca ggacaaaaga tcaacgccc                    39

<210> SEQ ID NO 34
<211> LENGTH: 35
<212> TYPE: DNA
<213> ORGANISM: Artificial Sequence
<220> FEATURE:
<223> OTHER INFORMATION: primer

<400> SEQUENCE: 34
gcgttgatct tttgtcctgg gccgcgccga tcgtg                        35

<210> SEQ ID NO 35
<211> LENGTH: 39
<212> TYPE: DNA
<213> ORGANISM: Artificial Sequence
<220> FEATURE:
<223> OTHER INFORMATION: primer

<400> SEQUENCE: 35
agcacgatcg gcgcggcgga ggacaaaaga tcaacgccc                    39

<210> SEQ ID NO 36
<211> LENGTH: 35
<212> TYPE: DNA
<213> ORGANISM: Artificial Sequence
<220> FEATURE:
<223> OTHER INFORMATION: primer

<400> SEQUENCE: 36
gcgttgatct tttgtcctcc gccgcgccga tcgtg                        35

<210> SEQ ID NO 37
<211> LENGTH: 39
<212> TYPE: DNA
<213> ORGANISM: Artificial Sequence
<220> FEATURE:
<223> OTHER INFORMATION: primer

<400> SEQUENCE: 37
agcacgatcg gcgcggcggt ggacaaaaga tcaacgccc                    39

<210> SEQ ID NO 38
<211> LENGTH: 35
<212> TYPE: DNA
<213> ORGANISM: Artificial Sequence
<220> FEATURE:
<223> OTHER INFORMATION: primer

<400> SEQUENCE: 38
gcgttgatct tttgtccacc gccgcgccga tcgtg                        35

<210> SEQ ID NO 39
<211> LENGTH: 39
<212> TYPE: DNA
<213> ORGANISM: Artificial Sequence
<220> FEATURE:

<223> OTHER INFORMATION: primer

<400> SEQUENCE: 39
agcacgatcg gcgcggcctg ggacaaaaga tcaacgccc                    39

<210> SEQ ID NO 40
<211> LENGTH: 35
<212> TYPE: DNA
<213> ORGANISM: Artificial Sequence
<220> FEATURE:
<223> OTHER INFORMATION: primer

<400> SEQUENCE: 40
gcgttgatct tttgtcccag gccgcgccga tcgtg                        35

<210> SEQ ID NO 41
<211> LENGTH: 39
<212> TYPE: DNA
<213> ORGANISM: Artificial Sequence
<220> FEATURE:
<223> OTHER INFORMATION: primer

<400> SEQUENCE: 41
agcacgatcg gcgcggcgta ggacaaaaga tcaacgccc                    39

<210> SEQ ID NO 42
<211> LENGTH: 35
<212> TYPE: DNA
<213> ORGANISM: Artificial Sequence
<220> FEATURE:
<223> OTHER INFORMATION: primer

<400> SEQUENCE: 42
gcgttgatct tttgtcctac gccgcgccga tcgtg                        35

<210> SEQ ID NO 43
<211> LENGTH: 39
<212> TYPE: DNA
<213> ORGANISM: Artificial Sequence
<220> FEATURE:
<223> OTHER INFORMATION: primer

<400> SEQUENCE: 43
agcacgatcg gcgcggcgca ggacaaaaga tcaacgccc                    39

<210> SEQ ID NO 44
<211> LENGTH: 35
<212> TYPE: DNA
<213> ORGANISM: Artificial Sequence
<220> FEATURE:
<223> OTHER INFORMATION: primer

<400> SEQUENCE: 44
gcgttgatct tttgtcctgc gccgcgccga tcgtg                        35

<210> SEQ ID NO 45
<211> LENGTH: 39
<212> TYPE: DNA
<213> ORGANISM: Artificial Sequence
<220> FEATURE:
<223> OTHER INFORMATION: primer

<400> SEQUENCE: 45
agcacgatcg gcgcggcgtc ggacaaaaga tcaacgccc                    39

```
<210> SEQ ID NO 46
<211> LENGTH: 35
<212> TYPE: DNA
<213> ORGANISM: Artificial Sequence
<220> FEATURE:
<223> OTHER INFORMATION: primer

<400> SEQUENCE: 46
gcgttgatct tttgtccgac gccgcgccga tcgtg                              35

<210> SEQ ID NO 47
<211> LENGTH: 39
<212> TYPE: DNA
<213> ORGANISM: Artificial Sequence
<220> FEATURE:
<223> OTHER INFORMATION: primer

<400> SEQUENCE: 47
agcacgatcg gcgcggcgtg ggacaaaaga tcaacgccc                          39

<210> SEQ ID NO 48
<211> LENGTH: 35
<212> TYPE: DNA
<213> ORGANISM: Artificial Sequence
<220> FEATURE:
<223> OTHER INFORMATION: primer

<400> SEQUENCE: 48
gcgttgatct tttgtcccac gccgcgccga tcgtg                              35

<210> SEQ ID NO 49
<211> LENGTH: 39
<212> TYPE: DNA
<213> ORGANISM: Artificial Sequence
<220> FEATURE:
<223> OTHER INFORMATION: primer

<400> SEQUENCE: 49
agcacgatcg gcgcggcctt ggacaaaaga tcaacgccc                          39

<210> SEQ ID NO 50
<211> LENGTH: 35
<212> TYPE: DNA
<213> ORGANISM: Artificial Sequence
<220> FEATURE:
<223> OTHER INFORMATION: primer

<400> SEQUENCE: 50
gcgttgatct tttgtccaag gccgcgccga tcgtg                              35

<210> SEQ ID NO 51
<211> LENGTH: 39
<212> TYPE: DNA
<213> ORGANISM: Artificial Sequence
<220> FEATURE:
<223> OTHER INFORMATION: primer

<400> SEQUENCE: 51
agcacgatcg gcgcggcgcg ggacaaaaga tcaacgccc                          39

<210> SEQ ID NO 52
<211> LENGTH: 35
<212> TYPE: DNA
<213> ORGANISM: Artificial Sequence
<220> FEATURE:
<223> OTHER INFORMATION: primer
```

```
<400> SEQUENCE: 52
gcgttgatct tttgtcccgc gccgcgccga tcgtg                                          35
```